Nov. 28, 1939.  W. J. McINTYRE  2,181,245
AUTOMOBILE BUMPER
Filed April 6, 1938  3 Sheets-Sheet 1
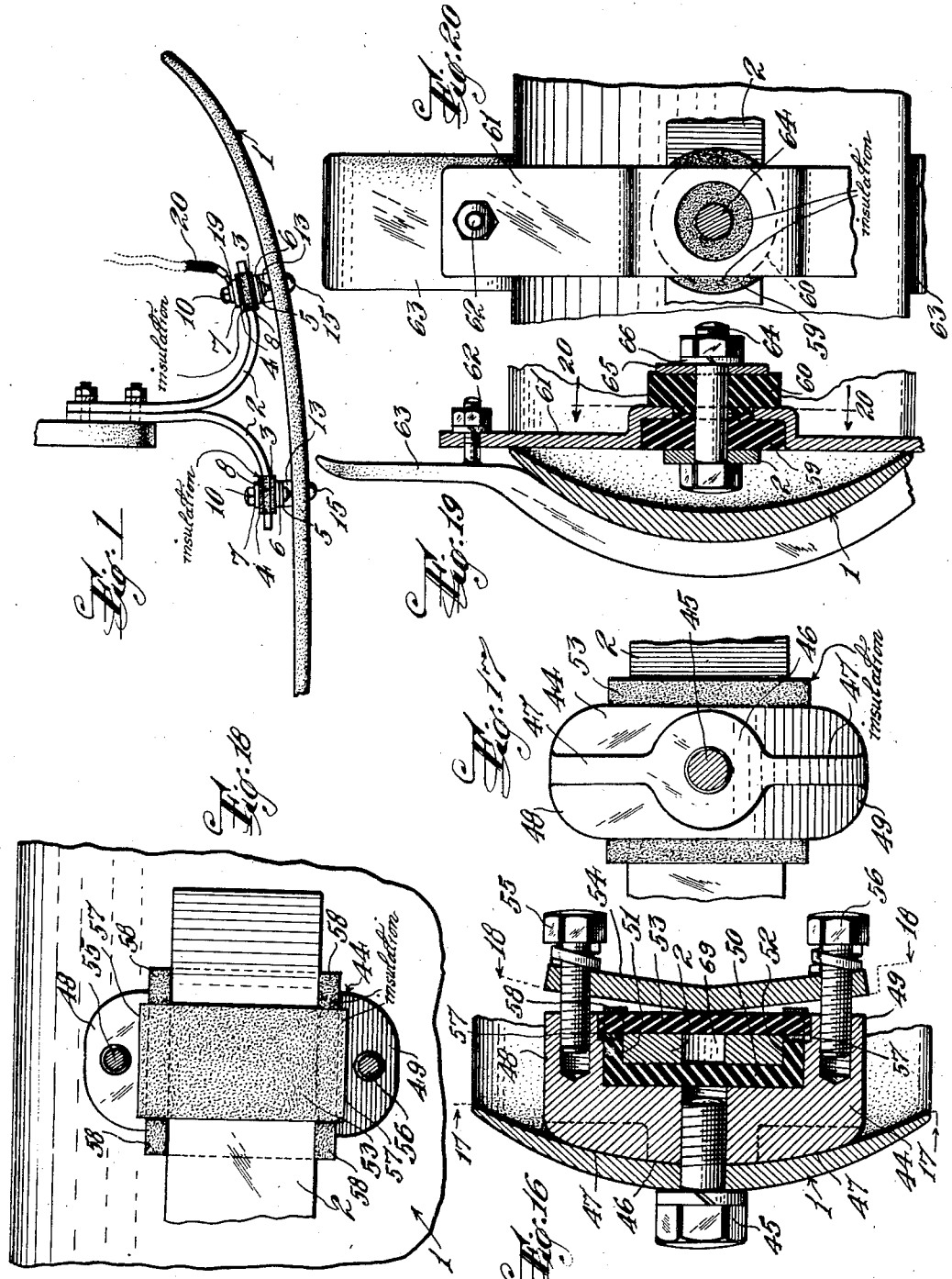

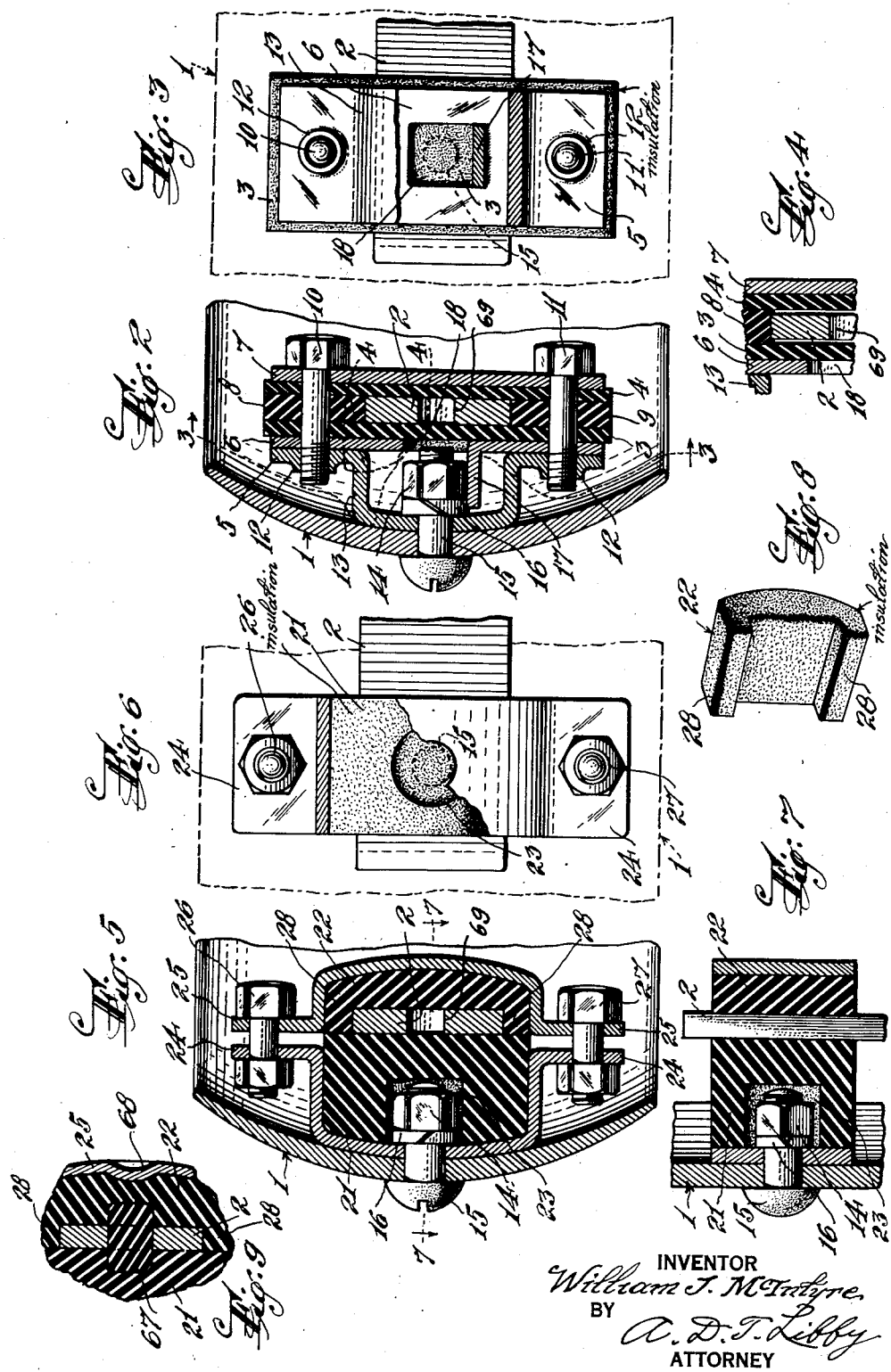

Nov. 28, 1939.  W. J. McINTYRE  2,181,245
AUTOMOBILE BUMPER
Filed April 6, 1938  3 Sheets-Sheet 3
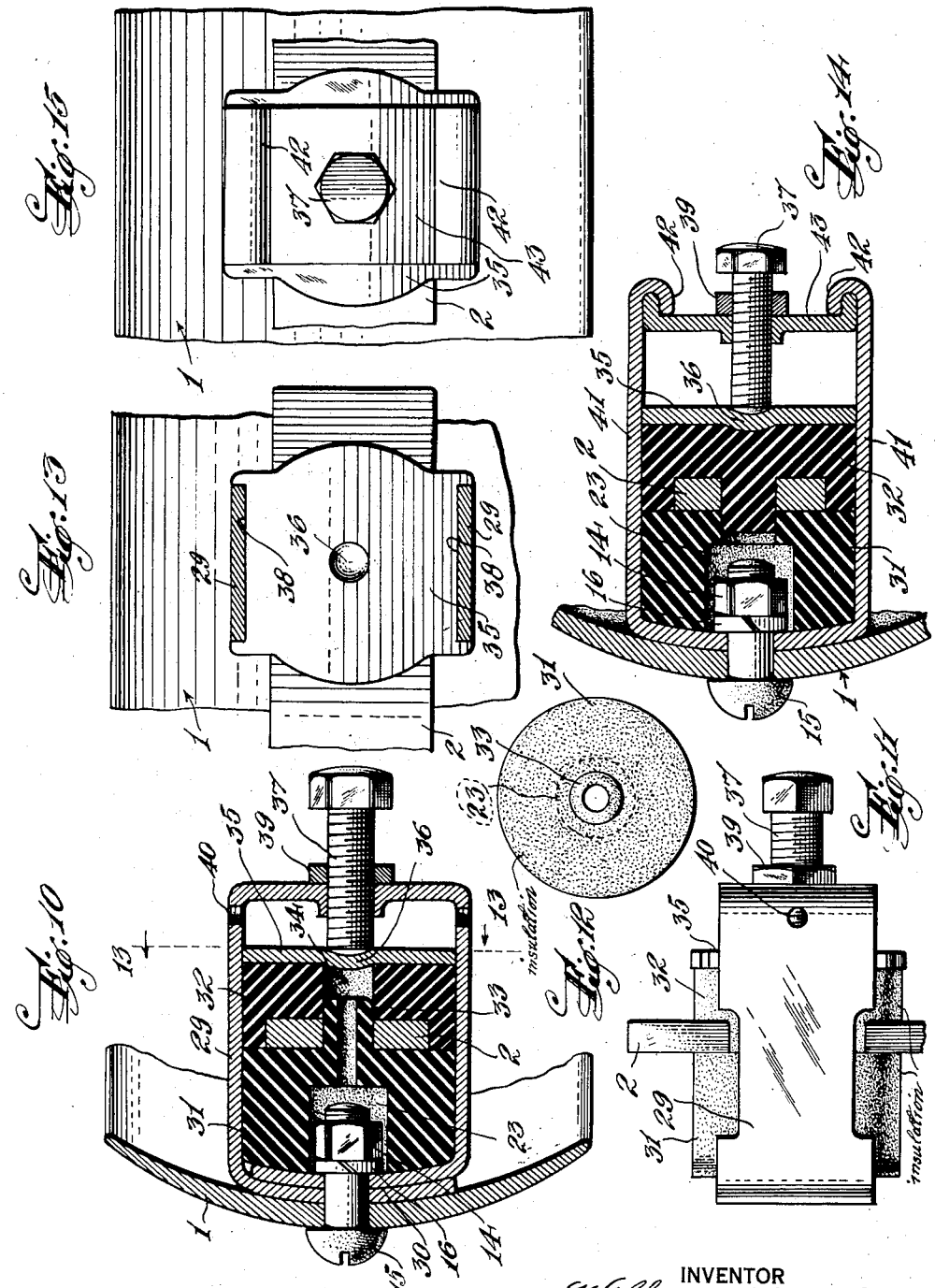
INVENTOR
William J. McIntyre,
BY
A. D. T. Libby
ATTORNEY Patented Nov. 28, 1939

2,181,245

UNITED STATES PATENT OFFICE 2,181,245

AUTOMOBILE BUMPER

William J. McIntyre, Jersey City, N. J.

Application April 6, 1938, Serial No. 200,373

15 Claims. (Cl. 250—33)

This invention relates to the use of a bumper on an automotive vehicle as an antenna for a radio set.

In the past it has been the common practice to mount antennas under the running board or chassis, in the roof of the car, or use what are commonly referred to as fish poles attached to some part of the chassis and extending vertically therefrom.

Many of these devices are not easy to install, particularly on cars now in use that are not equipped with radio sets. Furthermore, I have found, from experiments and tests, that all of these devices are inefficient and, from tests which I have made on an insulated bumper such as shown and described in Duffy Patent 1,858,541, assigned to me, I have discovered that an insulated bumper forms a far better antenna than any of the types of installation to which reference has been made. Besides being more efficient, the antenna bumper completely eliminates from sight everything which might give the appearance of an antenna, all of which is very useful on police cars wherein it is desirable to eliminate all conspicuous features.

It is therefore the general object of my invention to utilize at least one of the bumpers on an automotive vehicle as an antenna to thereby attain the advantages heretofore set forth.

A further object of my invention is to provide a unit construction which is cheap to manufacture and easy to install either on new cars at the factory or on those now in use, without the necessity of altering existing parts thereon.

A further object of my invention is to provide means for insulating a bumper support that will hold the change in location of the bumper to a minimum distance.

A further object of my invention is to provide insulating means which will give approximately equal support to the bumper, irrespective from what direction the strain may come.

Another object of my invention is to provide a reenforcement at the bumper support such that the strain, in case of shock, will be equally spread across the surface of the insulation.

It should be noted, in connection with the description which is to follow, that the style of bumpers has materially changed since the date of issue of the Duffy patent heretofore referred to and that most present-day bumpers have a single impact member carried on support brackets extending out from opposite frame members on the chassis, somewhat as indicated in Figure 1 of the annexed drawings, wherein the same numbers refer to corresponding parts in the different views.

In the drawings:

Figure 1 illustrates the application of my invention to a standard method of mounting a bumper to one side of a frame, only half of the bumper being shown.

Figure 2 is a vertical, sectional view showing the application of a preferred form of insulating unit used for supporting the bumper to the chassis support member.

Figure 3 is a part-sectional and part-elevational view on the line 3—3 of Figure 2.

Figure 4 is a fragmentary view at the point 4—4 of Figure 2, illustrating the condition of one of the insulating members before it is compressed by the clamping means as shown in Figure 2.

Figure 5 is a view similar to Figure 2, but showing a modified form of construction.

Figure 6 is a part-sectional and part-elevational view on the line 6—6 of Figure 5.

Figure 7 is a part-sectional and part-elevational view on the line 7—7 of Figure 5.

Figure 8 is a perspective view of one of the insulators shown in Figure 5.

Figure 9 is a fragmentary view showing modified details of Figure 5.

Figure 10 is a part-sectional and part-elevational view showing a further modified form of insulating unit.

Figure 11 is a plan view of the device shown in Figure 10.

Figure 12 is a plan view of one of the insulators shown in Figure 10.

Figure 13 is a section on the line 13—13 of Figure 10.

Figure 14 is a sectional view through a further modified form of insulating unit.

Figure 15 is a view of Figure 14 looking from right to left.

Figure 16 is a sectional view through a still further modified form of insulating unit.

Figure 17 is a view of the bumper end of the unit shown in Figure 16.

Figure 18 is a plan view on the line 18—18 of the structure shown in Figure 16, with the clamping members removed.

Figure 19 is a part-sectional and part-elevational view of a still further modified form of insulating unit.

Figure 20 is a view of Figure 19, looking from right to left.

Referring now to the details, 1 is a bumper which is to be insulated from a chassis support member 2. This is done by an insulating unit which is made up of a pair of insulators 3 and 4 which, for cheapness in manufacture, are preferably made identical. As shown in Figure 2, the insulators 3 and 4 extend transversely across the support member 2 and on opposite sides thereof, and a substantial distance beyond the edges.

Positioned over the insulators 3 and 4 are metallic plates or members 5, 6 and 7, the members 5 and 6 being located adjacent the insulator 3, while the metallic plate or member 7 is positioned over the insulator 4. Placed alongside the edges of the support member 2 are additional insulators 8 and 9 which are preferably of quite resilient material, such as soft rubber; that is to say, a grade of rubber which can be compressed when the clamping studs 10 and 11 are screwed into the plate 5 which preferably has the material at 12 pushed outwardly when forming the hole for the stud 10 so as to get additional thread on the member 5. While a nut may be used on the end of a bolt, this takes up more space, so for my constructions I prefer the method just described, of clamping the parts 3 to 9 inclusive together.

As shown in Figure 4, before the lag bolts 10 and 11 are set up to full clamping position, the members 8 and 9 are substantially thicker than the support member 2, but on clamping the parts described securely together, the members 8 and 9 are compressed so that the support member 2 is securely gripped by the metallic members 5, 6 and 7 engaging their respective insulators 3 and 4 which may, in certain cases, be made of a harder and tougher insulating material, such as hard fiber, although a proper grade of resilient insulating material may be used.

The member 5 has its central portion 13 formed outwardly away from the metallic member 6 to form a U-shaped pocket for a nut 14 adapted to be positioned therein to receive a stud or threaded member 15 carried by the bumper 1. Preferably a lock washer 16 is used between the nut 14 and the inner face of the pocket 13. The member 6 has a lug 17 thrown outwardly therefrom, leaving an opening 18 therein to receive the leg of the stud 15 if this is long enough to go through the lock washer 16 and the nut 14.

In the assembly of this unit the metallic member 13 is first slipped over the stud 15, and the lock washer and nut put in place and tightened to final position, and then the other parts are added in order, as will be readily understood by reference to Figure 2. For an installation in the field, if the bumper is held to the chassis by four support members as indicated in Figure 1, then four of the units shown in Figures 2 and 3 will be required to fully insulate the bumper from the chassis. Since the lag bolts 10 and 11 are insulated from the support member 2, a terminal 19 may be passed under the head of one of the lag bolts and clamped in place, to which terminal the antenna wire 20 is attached for connecting the antenna bumper 1 to the radio set mounted in some part of the vehicle.

In the form of device shown in Figures 5 to 9 inclusive, only two insulating parts 21 and 22 are actually required and both are preferably made of resilient material, such as rubber soft enough to be compressed and strong enough to withstand the service. The insulator 21 is provided with a pocket 23 to receive the nut 14 and lock washer 16 which are associated with the stud 15 as in Figure 2. Two metallic clamping members 24 and 25 substantially fully encompass the insulators 21 and 22, and these are drawn together by bolts and nuts 26 and 27.

As will be seen from Figure 8, the insulator 22 has a channel therein with sides 28 which pass over the edges of the support member 2 as shown in Figure 5, but the depth of the channel is less than the thickness of the support member 2, so the clamping action on the bolts 26 and 27 will force the insulators 21 and 22 into firm gripping engagement with the support 2 before the edges of the sides 28 engage the insulator 21. However, in any event, since the insulators 21 and 22 are resilient, the material will mushroom and cause a firm gripping engagement with the support member.

In Figure 9 the insulators 21 and 22 are recessed and the support member has a hole therein to receive a cylindrically shaped block of insulation 67 which may be used in some cases to prevent relative lateral display of the parts in question. Also the insulator 22 may have a depression therein to receive a projection 68 on the outer metallic member 25.

In Figures 10 to 13 inclusive, the insulating unit is made up of a one-piece housing member 29 which has its ends overlapped as indicated at 30. These overlapping ends have a hole for the stud 15. The insulators 31 and 32 used in this form are very much like those shown in Figure 5, except the insulator 31, having a pocket 23 for the nut 14 and lock washer 16, has a circular projection 33 which extends through a hole in the support member 2 and extends into a hole 34 in the insulator 32. The projection 33 acts to prevent any lateral movement between the bumper and the support member. Adjacent the outer side of the insulator 32 is a metallic clamping plate 35 which preferably has an indented boss 36 located in one end of the hole 34 of the insulator 32. A depression in the boss 36 provides a seat for the end of a set screw 37 carried in the end of the housing member 29. The plate 35 is positioned so that it cannot shift by means of a channel-like seat 38 which engages the opposite sides of the housing member 29.

After the member 29 has been assembled to the bumper 1 in a manner similar to the devices heretofore described, and the insulators 31 and 32 put in place in connection with the support member 2, the clamping plate 35 is forced inwardly by the set screw 37, causing the resilient members 31 and 32 to grip the support member 2, after which a lock nut 39 is set in locking position. The member 29 may have one or more holes 40 drilled or perforated and tapped therein for the purpose of fastening the antenna wire thereto.

In the unit shown in Figures 14 and 15 the encasement member 41, while made in one piece, is made reversely from the member 29 shown in Figure 10, in that the outer rim 42 is bent over to form a seat for a clamping member 43 which carries a set screw 37 and lock nut 39. Otherwise the construction is generally the same as in Figure 10.

In Figures 16 to 18 inclusive, a metallic member 44 is fastened to the bumper 1 similarly as in the other views, or by a lag screw 45. The member 44 has a surface 46 with rib portions 47 adapted to contact with the bumper 1. The member 44 has its opposite ends 48 and 49 projecting to form a recess within which an insulator 50 is positioned. The bottom of the insulator 50 is adapted to receive the support member 2 which is prevented from contacting on its edges with the projections 48 and 49 by reason of vertically extending portions 51 and 52 of the insulator 50. The height of the edges 51 and 52 is less than the thickness of the support member 2 so that an insulating clamping member 53, adapted to be engaged by a metallic clamp 54 brought into clamping position by studs 55 and 56, will securely grip the member 2 before the insulator 53 will contact with the upper edges 51 and 52. To positively locate the insulators 50 and 53 in the member 44, the insulator 53 extends through into a broad channel recess 57 in the member 54, and parts 58 at each of the four corners of the insulator 53 extend upwardly on opposite sides and at opposite corners of the insulator 53 to prevent it from shifting in the unit mounting.

In Figure 19 the insulators 59 and 60 are very much like those shown in the Duffy patent but are carried by a bracket 61 fastened to a stud 62 which clamps the bumper guards 63 to the bumper 1. In this case the support member 2 is fastened in position by a stud 64, plate 65 and lock washer 66. Before the parts are clamped together, there is a space between the ends of the insulators 59 and 60, and also between the periphery of the insulator 59 and those set in the member 61, but when the clamping operation is finished, the insulators 59 and 60 are mushroomed so that they will fill the spaces mentioned.

The antenna may be electrically connected to the bumper through the bracket 61 and stud 62, or in any other satisfactory manner.

By reference to Figure 1, it will be understood that the support members 2 are normally fastened directly to the bumper 1. To install my unit construction for utilizing the bumper as an antenna, no change, whatever, is necessary in the support members 2, or the bolt 15 and nut 16.

In the construction of the present-day bumper and support thereof, the size of the support, together with the size of the bumper-holding bolt and the hole in the support through which the bolt passes, are of such dimensions that if altered trouble may be encountered. If the bumper be insulated by trying to insulate the bolt in the support, the normal hole therein must be enlarged at considerable time and expense, with a resultant weaker support, or the bolt will have to be made smaller, which will weaken the entire structure. From tests made, the present construction appears to be the smallest practical size for the strength required. The hole in the support member 2, from which the bolt 15 has been taken, is indicated by the numeral 69.

While the unit structures herein described provide means for insulating a bumper on an automotive vehicle so it may be used as an antenna, these units also serve to attain at least one of the objects of the said Duffy patent; that is to say, they provide means for absorbing the shocks and dampening the vibration between the bumper and its support members.

From what has been said it will be seen that the details for carrying out my improved manner of insulating a bumper, as broadly set forth in the Duffy patent, may be varied over a considerable range without departing from the spirit of the invention or the scope of the appended claims.

What I claim is:

1. Means for use in insulating a vehicle bumper from a support member, including insulators disposed in cooperative relationship on each side of the support member, metallic members encompassing said insulators, and means for forcing said metallic members together for causing said insulators to grip said support member, and a bolt carried by the bumper with means for fastening the bolt to one of said metallic members, thereby anchoring said metallic member to the bumper.

2. Means for use in insulating a vehicle bumper from a support member, including a pair of insulators disposed, one on each side of the support member, metallic members encompassing said insulators, means for relatively moving said metallic members to force the insulators to grip said support member, insulating means for preventing said support member from shifting position in the metallic members, and means for securely fastening one of said metallic members to the bumper.

3. Means for use in insulating a vehicle bumper from a support member, including a pair of insulators disposed, one on each side of the support member, a pair of U-shaped metallic members encompassing said insulators, clamping means for drawing said metallic members toward each other to force these members to clamp the insulators around the support member, at least one of said insulators having means for preventing said support member from shifting position in the metallic members, and means for securely fastening one of said metallic members to the bumper.

4. Means for use in insulating a vehicle bumper from a support member, including a pair of insulators disposed, one on each side of the support member, a U-shaped metallic member supporting the insulators and completely encompassing them, means carried by the metallic member for forcing the insulators into gripping engagement with the support member, means on at least one of said insulators for preventing said support member from shifting position in the metallic members, and means for securely fastening said metallic members to the bumper.

5. Means for use in insulating a vehicle bumper from a support member, including insulators completely surrounding a portion of the support member, metallic members disposed on opposite sides of the insulators, means for clamping the metallic members and insulators together to grip the support member, a metallic member on one side having a part forming a pocket for a nut, and a threaded member associated with the bumper going through said last-mentioned metallic member into the nut to hold the bumper to the support through said parts.

6. Means for use in insulating a vehicle bumper from a support member, including insulators completely surrounding a portion of the support member, metallic members disposed on opposite sides of the insulators, means for clamping the metallic members and insulators together to grip the support member, the metallic members on one side of said insulators being two in number, one being substantially flat but having a lug formed outwardly at the center to provide a clearance hole for a bumper-holding member and a stop for a nut, the other of said two metallic members being formed to provide a pocket for a nut which is located in the pocket so as to engage said stop lug, and a threaded member passing from the bumper into said nut to anchor the bumper to the support member through said parts.

7. Means for use in insulating a vehicle bumper from a support member, including a pair of insulators passing transversely across and beyond the edges of the support member, one on each side thereof, a pair of insulators positioned, one each, between the extending ends of the first pair and alongside of the edges of the support, metallic members spaced over the first-mentioned insulators, and means for clamping the metallic members and insulators together to securely hold them to the support member, and means for fastening one of said metallic members to the bumper.

8. Means for use in insulating a vehicle bumper from a support member, including a pair of insulators passing transversely across and beyond the edges of the support member, one on each side thereof, a pair of insulators positioned, one each, between the extending ends of the first pair and alongside of the edges of the support, metallic members spaced over the first-mentioned insulators, and means for clamping the metallic members and insulators together to securely hold them to the support member, one of the metallic members having a U-shaped formation to provide a pocket for a nut, a nut located in said pocket, to receive a threaded member carried by the bumper, thereby insulatingly anchoring the bumper to said support member.

9. Means for use in insulating a vehicle bumper from a support member, including a pair of insulators passing transversely across and beyond the edges of the support member, one on each side thereof, a pair of insulators positioned, one each, between the extending ends of the first pair and alongside of the edges of the support, metallic members spaced over the first-mentiond insulators, and means for clamping the metallic members and insulators together to securely hold them to the support member, one of the metallic members having a U-shaped formation to provide a pocket for a nut, another flat metallic member positioned between the metallic member having the U-shaped formation and one of the first-mentioned insulators, a stop lug on said flat member, a nut located within the U formation and held from turning by said lug, and a threaded stud carried by the bumper for going through said U formation into the nut, thereby clamping the bumper to said metallic member.

10. Means for use in insulating a vehicle bumper from a support member, including a pair of insulators passing transversely across and beyond the edges of the support member, one on each side thereof, a pair of insulators positioned, one each, between the extending ends of the first pair and alongside of the edges of the support, metallic members spaced over the first-mentioned insulators, and means for clamping the metallic members and insulators together to securely hold them to the support member, at least said second-mentioned pair of insulators being of quite resilient material and initially substantially thicker than said support member, whereby when said clamping means are set up, the resilient insulators are compressed, thereby acting not only as insulators but as anti-rattling means, and means for fastening one of said metallic members to the bumper.

11. Means for insulating a bumper of an automotive vehicle whereby the same will act as an antenna for a radio set, said means comprising an insulating unit for each connection of the bumper to a support member, the insulating unit including insulators surrounding a portion of a support member, and metallic members embracing the greater part of said insulators, clamping means disposed on opposite sides of the support member for clamping the metallic members and insulators securely around the support member, and means for fastening one of said metallic members to the bumper.

12. Means for insulating a bumper as set forth in claim 11, further characterized in that the means for fastening the unit to the bumper includes a U-shaped formation in one of the metallic members forming a pocket, a nut non-rotatably positioned in the pocket and a threaded member carried by the bumper for going through said metallic member into the nut.

13. Means for insulating a bumper as set forth in claim 11, further characterized in that at least some of the insulators are quite resilient, whereby the clamping action thereon causes the unit to act as an anti-rattle and shock-absorbing device.

14. A unit structure for use in insulating a vehicle bumper from a support member, said unit including insulators disposed around a portion of the support member to completely insulate said portion, metallic members encompassing the greater part of said insulators with means for clamping them so they will firmly clamp the insulators to the support member, and means for fastening one of said metallic members securely to the bumper.

15. A unit construction as set forth in claim 14, further defined in that the unit may be installed on present-day cars by using the present bumper bolt for fastening the bumper to said metallic member of the unit and without change in the present support member.

WILLIAM J. McINTYRE.